J. ROSNER.
GARMENT HANGER.
APPLICATION FILED FEB. 10, 1914.

1,124,811.

Patented Jan. 12, 1915.
2 SHEETS—SHEET 1.

Witnesses
James Ervin
M. L. Laughlin

Inventor
Jacob Rosner
By Victor J. Evans
Attorney

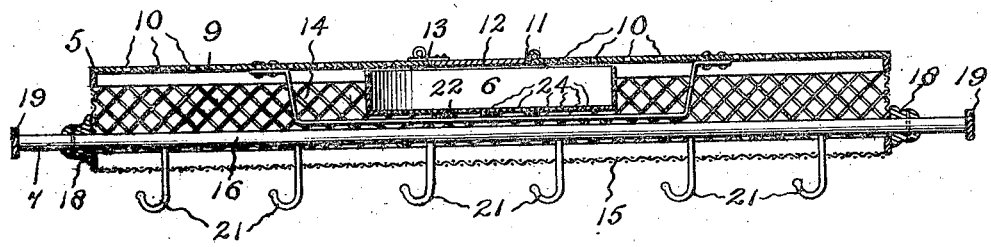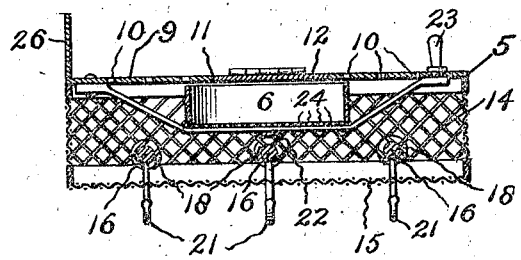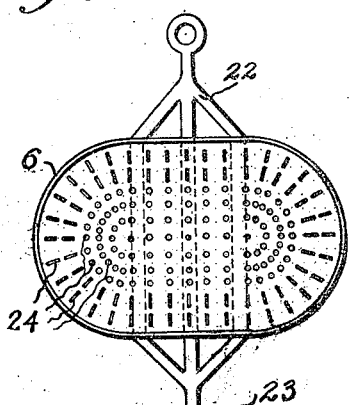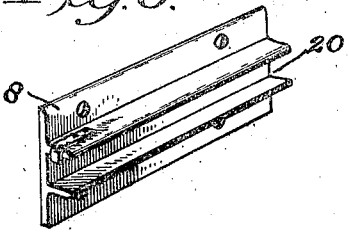

UNITED STATES PATENT OFFICE.

JACOB ROSNER, OF NEW YORK, N. Y.

GARMENT-HANGER.

1,124,811.

Specification of Letters Patent.

Patented Jan. 12, 1915.

Application filed February 10, 1914. Serial No. 817,889.

*To all whom it may concern:*

Be it known that I, JACOB ROSNER, a citizen of the United States, residing at New York city, in the county of New York and State of New York, have invented new and useful Improvements in Garment-Hangers, of which the following is a specification.

The general object of this invention is to effect the fumigating of garments by an insecticide when the same have been stored away for future use.

Another object is to facilitate the operation of distributing insecticides on and within the garment when storing the same, for the purposes of preventing the defacement of the garments by deleterious insects, such as moths and the like. And to these ends the invention consists of an open-work frame provided with clothes-hanging hooks and a receptacle located within the frame for dispensing an insecticide when desired.

Other objects will appear and be better understood from that embodiment of my invention of which the following is a specification, reference being had to the accompanying drawings forming part thereof, in which:—

Figure 1:
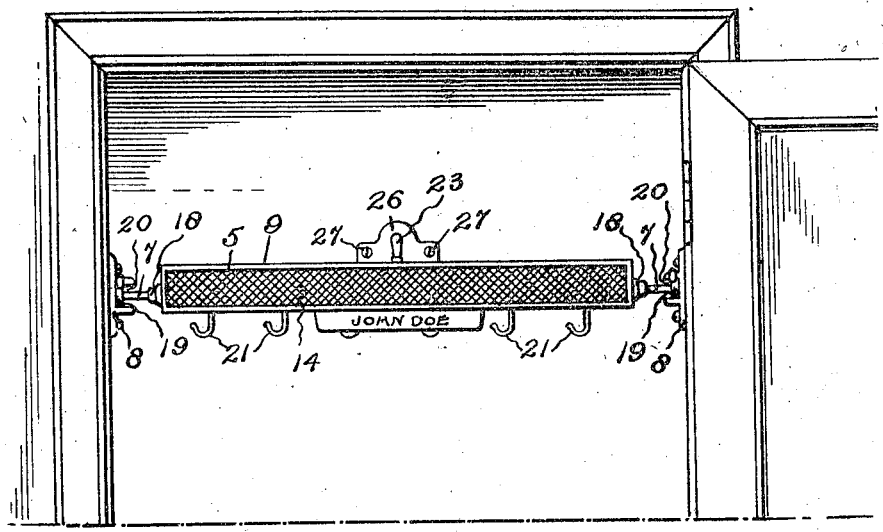
Figure 2:
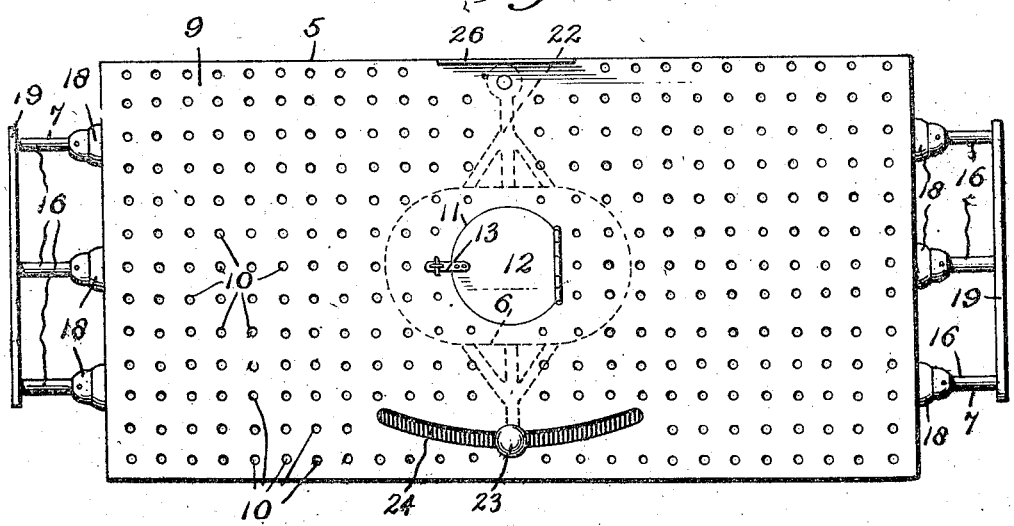

Figure 1 is an elevational view of my device in position with a clothes-compartment. Fig. 2 is a top plan view of the device. Fig. 3 is a longitudinal sectional view of the device. Fig. 4 is a vertical cross sectional view of the same. Fig. 5 is a detail top plan view of the insecticide receptacle. Fig. 6 is a detail perspective view of a bracket for retaining the device in position within a closet.

As shown in the drawings the device is composed of a frame 5, the insecticide retainer 6, the clothes-holding member 7 and the brackets 8 which are adapted to be secured within a closet for securing the frame in position. The frame 5 may be any suitable shape, but for the purposes of illustration, the present embodiment is shown in the form of a rectangle. The top plate 9 of the frame is provided with a series of perforations 10 and is further provided with an enlarged central opening 11 for permitting access to the interior of the frame when desired. This opening is normally closed by a hinged cover 12 and is suitably secured in a locked position by means of a suitable catch 13. The sides of the frame are latticed as shown by oblique cross laths 14, and the bottom of the frame is formed of a suitable open-work, such as wire mesh or the like, as indicated by 15.

Carried by the frame 5 and preferably disposed longitudinally therein is the clothes-hanging member 7. This member is formed of a series of shafts or rods 16, which project beyond the sides of the frame, and for the purpose of being held in substantially fixed position the collars 18 are secured to the rods in any suitable manner and are adapted to contact against the exteriors of the sides of the frame as shown. These collars may be made of any suitable material and for the purposes of ornamentation may be provided in fancy shapes, if desired. The ends of the rods are connected and secured by cross bars 19—19, which are adapted to be received by the brackets 8 when it is desired to place the device in a closet as shown. It is to be understood that the length of the rods will be made to conform to the width of the closet in which the device is to be placed, and by virtue of the brackets being provided with the guide channel 20 for the reception of the cross rods 19, the device may be removed from the closet at will; it being necessary only to secure the brackets to the wall of the closet as shown. Arranged at spaced intervals along the rods are the depending hooks 21, which extend through the wire bottom of the frame, and are adapted to hold the garments when they are stored away.

Located centrally within the frame is the insecticide receptacle 6; this receptacle is carried by a suitable bracket 22, which has one end pivotally connected to the top plate 9 of the frame, and has its other end extending through the plate and is provided with a knob or handle 23. This knob is adapted to travel in an arc-shape slot 24 and by means of reciprocating this knob in the slot, the receptacle is given a lateral movement. By virtue of the bottom 25 of the receptacle being perforated, the agitation thereof will distribute the contained insecticide over the garments which are suspended on the hooks located therebeneath. Thus the insecticide will be spread over all the garments, and will obviously enter the various portions of the same and thereby tend to prevent insects from destroying the material.

It will be seen that the top 9 of the frame may operate as a shelf, and by virtue of the perforations provided therein, the fumes of the insecticide may travel through the perforations and permeate any article placed on the top; and manifestly by virtue of the sides being open the fumes may escape therethrough in like manner, and permeate the atmosphere within the closet thereby affording results equal to well-known cold-storage means for protecting garments.

For the purpose of permanently securing the device within a closet a back plate 26 is mounted on the frame and is provided with suitable holes, whereby the frame may be held to the wall of the closet by means, such as the screws 27.

It is obvious that those skilled in the art may vary the details of construction and arrangements of parts without departing from the spirit of my invention and therefore I do not wish to be limited to such features except as may be required by the claims.

What is claimed as new is:

1. A clothes-hanger comprising a frame, a series of rods arranged transversely in the frame and provided with clothes-hanging hooks, and a receptacle for retaining an insecticide, pivotally mounted on the frame above the rods, said receptacle adapted to be agitated for the purpose of distributing the insecticide over the clothes.

2. A clothes-hanger comprising an openwork frame, a series of rods arranged transversely in the frame and provided with clothes-hanging hooks, a perforated receptacle located in the frame above the rods for retaining an insecticide, and means pivotally mounted on the frame for carrying the said receptacle, said means adapted to be agitated for distributing the insecticide over the clothes.

3. A clothes-hanger comprising an openwork frame adapted to be secured to a wall, rods arranged transversely in the frame and having clothes-hanging hooks, the said rods projecting beyond the sides of the frame and adapted to operate as supporting arms for the frame, a perforated receptacle located in the frame above the rods for retaining an insecticide and means pivotally mounted in the frame for carrying the said receptacle, the said means being adapted to be agitated for the purposes set forth.

In testimony whereof I affix my signature in presence of two witnesses.

JACOB ROSNER.

Witnesses:
W. E. PALMER,
GEO. A. BYRNE.